United States Patent [19]

Sanderson et al.

[11] Patent Number: 4,493,951
[45] Date of Patent: Jan. 15, 1985

[54] DEVICE FOR USE IN TESTING A MODEM COUPLED TO A TELEPHONE LINE BY MODULAR CONNECTORS

[76] Inventors: Edward Sanderson, 40 Crestwood Dr.; Laurence S. Sanderson, 13 Mayflower Rd., both of Framingham, Mass. 01701; Robert S. Kalinowski, Jr., 22 C Beacon Village, Burlington, Mass. 01803

[21] Appl. No.: 486,260

[22] Filed: Apr. 18, 1983

[51] Int. Cl.³ .............................................. H04B 3/46
[52] U.S. Cl. ........................ 179/175.3 F; 179/175.25; 324/158 F; 361/428; 339/156 R
[58] Field of Search .................. 179/175.3 F, 175.25, 179/2 C, 2 DP, 175.2 C, 175.1 R; 324/52, 51, 158 F, 158 P, 158 R; 361/352, 356, 426, 428; 339/153, 154, 156; 371/22

[56] References Cited

U.S. PATENT DOCUMENTS

| | | | |
|---|---|---|---|
| 3,718,859 | 2/1973 | Arlow | 324/158 F |
| 3,745,515 | 1/1973 | Michaels | 339/156 R |
| 4,431,249 | 2/1984 | Frantz et al. | 339/156 R X |

FOREIGN PATENT DOCUMENTS 833911  5/1960  United Kingdom .
1416259 12/1975  United Kingdom .

Primary Examiner—Stafford D. Schreyer
Attorney, Agent, or Firm—Irving M. Kriegsman

[57] ABSTRACT

A device for use in testing the wiring integrity and/or troubleshooting system faults in a modem and/or an associated telephone line which are coupled together through a modular plug coupled to the modem and a modular jack coupled to the telephone line. A first eight-contact modular jack adapted to receive the modular plug on the modem is mounted on one end of a box-shaped housing. A second eight-contact modular jack is mounted on the other end of the housing. The two modular jacks are electrically connected by a set of eight conductor elements, each conductor element connecting a contact on the first jack with a corresponding contact on the second jack. A test pin is coupled to each conductor element and projects upward from the housing. A set of three cables are also provided. Each cable has an eight-contact modular plug at one end for plugging into the second modular jack on the box device, the box along with the appropriate cable are connected in series between the modem and the telephone line and a meter or other piece of test equipment is connected to whichever test pins the user wishes to test.

9 Claims, 5 Drawing Figures

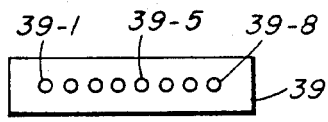
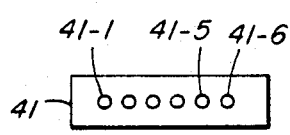
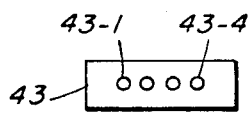
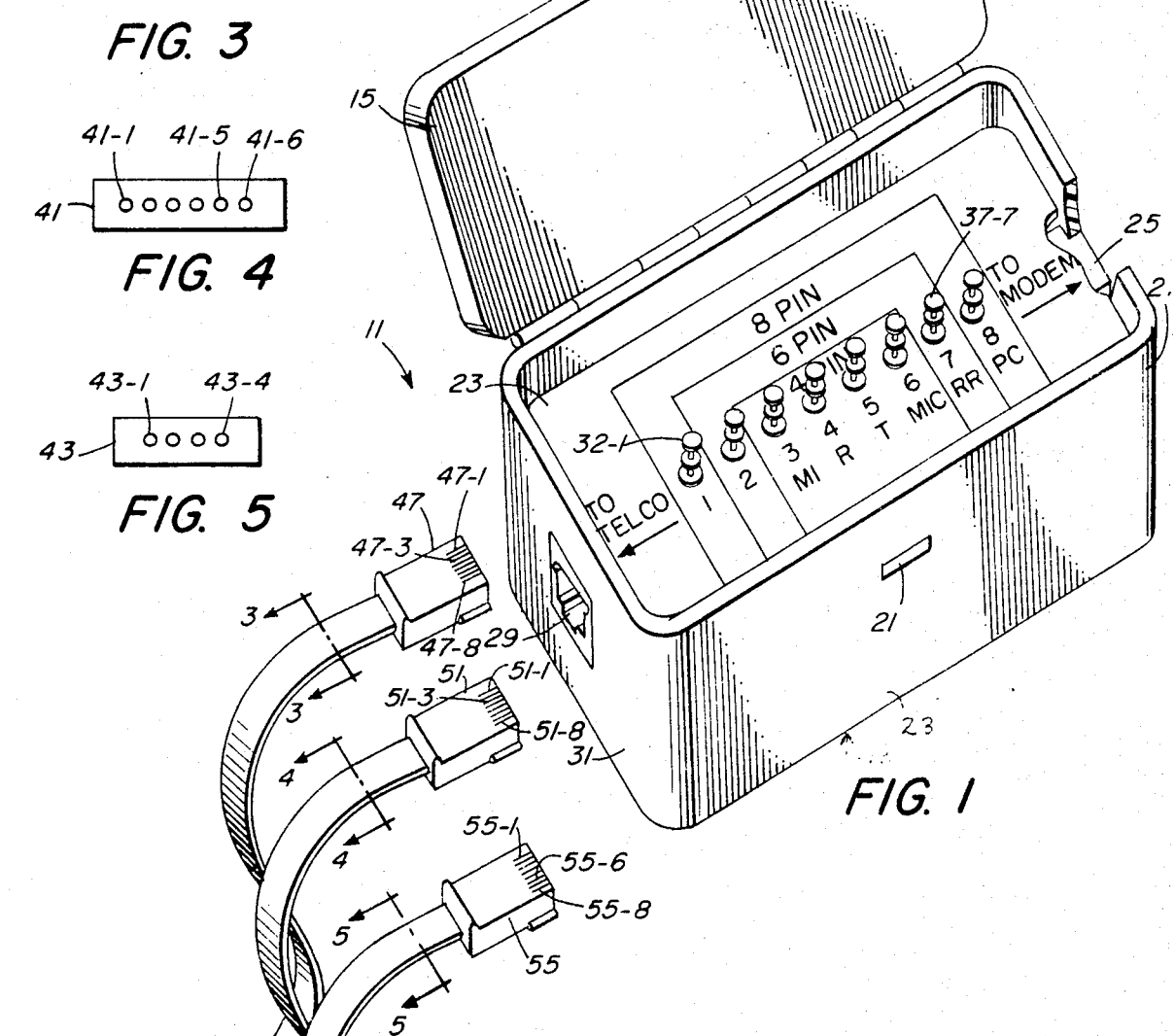
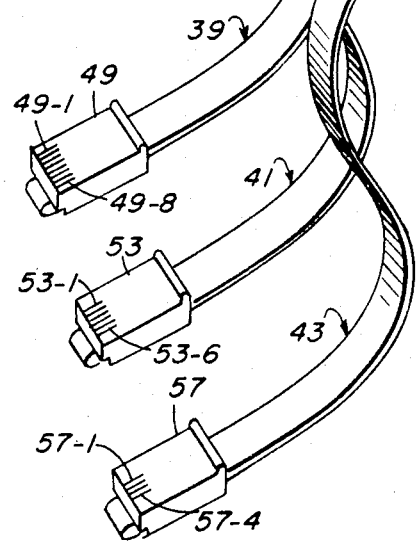
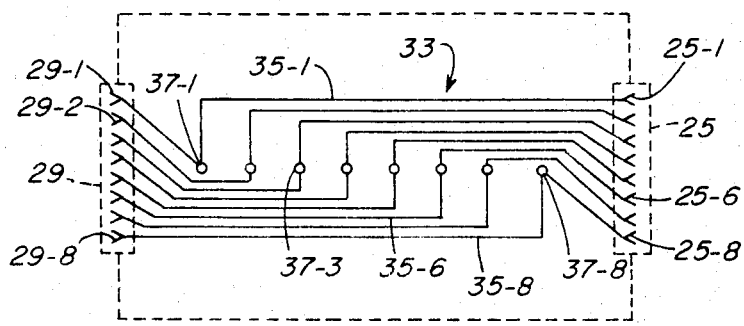

DEVICE FOR USE IN TESTING A MODEM COUPLED TO A TELEPHONE LINE BY MODULAR CONNECTORS

BACKGROUND OF THE INVENTION

The present invention is directed generally to a device for use in testing the wiring integrity and/or determining the location of system faults in a modem and/or an associated telephone line and more particularly to a device for use in testing the wiring integrity and/or determining the location of systems faults in a modem and/or an associated telephone line which are coupled together by modular type connectors.

It is known to transmit data back and forth from a computer at one location to a computer at another location over a telephone line by connecting the computer at each location to the telephone line through a modem. The moden and telephone line at each location are normally coupled together by a pair of mating connectors, one connector being attached to the telephone line and other connector being attached to the modem. Over the last several years, modular type connectors have become widely used in this and other types of applications. One advantage of modular type connectors is that multiple wires can be easily, efficiently and very quickly mass terminated. Another advantage of modular type connectors is their relatively small size. One of the limitations with modular type connectors, however, is that once they are attached to the multiple wires, they cannot be very easily removed. Another limitation with modular type connectors is that because of their very small size the contact elements cannot be individually contacted with conventional sized test probes or conventional sized clips such as are normally attached to meters or other test equipment.

During an initial installation of a modem/telephone line system it is often desirable to test the wiring connections to insure that the wires are properly connected and the system is operating correctly. Once installed, in the event of a system breakdown it it generally helpful to test the various lins with the modem connected to determine if the fault is in the modem or in the telephone line. As can be appreciated, using modular type connectors such testing is extremely difficult, if at all possible.

Accordingly it is an object of this invention to provide a device for use in testing a modem and/or an associated telephone line which are coupled together.

It is another object of this invention to provide a device for use in testing a modem and/or an associated telephone line which are coupled together by modular connectors.

It is still another object of this invention to provide a device for use in testing a modem and/or an associated telephone line which are adapted to be coupled together by modular connectors while the modem is electrically coupled to the telephone line.

It is a further object of this invention to provide a device which may be used with test equipment having conventional sized test probes and/or clips for testing a modem and/or an associated telephone line which are coupled together by modular type connectors.

It is yet another object of this invention to provide a device which is easy and inexpensive to fabricate and easy to use for use in testing a modem and/or an associated telephone line which are coupled together by modular type connectors.

DISCUSSION OF KNOWN PRIOR ART

In U.S. Pat. No. 3,976,849 to L. W. Champan there is disclosed a telephone line testing device comprising a support provided with a four-contact jack adapted to receive a four-terminal handset plug connected to the telephone lines, said jack having two d.c. contacts and two a.c. contacts, a series circuit branch on said support including a first rectifier and a first electrical light-emitting device, circuit means connecting said series circuit branch to the two d.c. contacts, a second circuit branch on said support comprising an a.c. amplifier including a d.c. blocking input capacitor, a second electrical light-emitting device connected to the output of the amplifier, and a second rectifier connected in series with the input of the amplifier, and circuit means connecting said second circuit branch the two a.c. jack contacts, and wherein said amplifier comprises a transistor, the output of said second rectifier being connected through said blocking capacitor to the base of the transistor and to the collector of the transistor, the second electrical light emitting device being connected in the emitter circuit of the transistor.

In U.S. Pat. No. 3,350,515 to L. J. Semon there is disclosed a telephone line testing unit including, in combination: a casing including an inlet jack and an outlet plug; tip, ring, and sleeve conductors connecting said plug; an indicating means; first switch means connecting one side of said indicating means to said tip conductor and responsive to insertion of a plug in said inlet jack to open the connection from said one side of said indicating means to said tip conductor; second switch means adapted to connect the other side of said indicating means to said ring conductor when in a first position, whereby insertion of said plug into a subscriber's line jack with said second switch means in said first position connects any existing tip and ring voltage in said subscriber's line across said indicating means; and a third switch means connected between said other side of said indicating means and said sleeve conductor, closing of said third switch means connecting any existing tip and sleeve voltage in said subscriber's line across said indicating means.

In U.S. Pat. No. 3,084,232 to P. M. Buhler there is described a system for field testing and half-tapping a conductor of a telephone line pair in a cable, wherein full voltage is divided between the conductors of the line when the line is in service and said full voltage is applied to one of said conductors, when said line is not in service, comprising; means for selectively indicating the line voltage condition; means for tapping said indicating means to a conductor of said line through a first circuit to determine whether it is in service or not in service; and means for tapping said indicating means to said conductor of the line through a second circuit at a point adjacent the first tapping connection, said circuits having electrical characteristics such that the indication on the indicating means will differ slightly depending upon which circuit is connected.

In U.S. Pat. No. 3,986,106 to Shuck et al there is described a portable cable test set which includes a master unit connected to one end of a cable made up of multiple wire pairs and a remote unit connected to the other end. The master unit generates a series of digital pulses, a pulse being applied to a first wire of each wire pair in a predetermined sequence. The remote unit interconnects the wire pair with a resistor of predetermined resistance which differs from every other resistor and which is much greater than the resistance of the wire pair undergoing testing. A corresponding resistor of like value is included in the master unit and receives the same pulse that is applied to the wire undergoing testing. A comparator in the master unit compares the magnitude of the pulse sent over the wire pair with the magnitude of the pulse sent through the reference resistance in the master unit and a sequencer applies the next pulse to the next wire and next corresponding resistance when the preceding pulse magnitudes are equivalent. An interrupter stops the test sequence when the compared pulses are unequal in magnitude, and an indicator when identifies the wire pair having conditions activating the sequence interrupter.

In U.S. Pat. No. 3,594,517 to C. L. Wooddruff there is disclosed a device for verifying the core panel wiring of identifier equipment for direct dial long distance telephone equipment comprising plurality of lamps connected through two groups of relays to the output of the core panel of the identifier equipment, wherein the first of said two groups of relays are operatively connected to one of the sequencing relays of the identifier equipment which selectively provides input voltage to the core panel, and the second group of relays being connected to a source of energy independent of the sequencing relays to hold in an illuminated condition any lamps lighted in response to output from the first sequential output from the core panel. An additional lamp operatively connected to the identifier equipment to indicate that the equipment is in use, a party selection switch connected to the party identification relays of the identifier equipment, and a starting switch to connect the verifying device to the circuitry of the identifier equipment.

In U.S. Pat. No. 3,704,347 to R. W. Brown there is described a method and portable panel structure for carrying out the method serve to restore rapidly telephone service to customer's lines to a central office has been inadvertently severed. Arbitrary connections from the severed portions of the cable extending from the central office are made to central office jacks in the panel and arbitrary connections from the severed cable portion extending from the customer's premises are connected to customer jacks on the panel. A tester's plug or answer cord together with a voltage source, ringing generator, and test unit are provided in the panel and enable a tester to identify a customer's telephone number and patch the same with one of several patch cords to the proper central office jack thereby immediately restoring service.

In U.S. Pat. No. 3,711,661 to J. C. Garrett, etc. there is disclosed test unit apparatus for use relating to distribution terminal assemblies employed in connection with telephone trunks under test. Testing is performed through the use of voltage-sensing probes which monitor the potential present on trunks characterized by either three or four leads. Comprehensive testing of the wiring of the equipment associated with the trunk being tested reveals all commonly encountered trunk wiring defects, visual indications of malfunctioning circuits being provided by means of plural lamps each having a distinctive function.

SUMMARY OF THE INVENTION

A device for use in testing the wiring integrity and/or determining the location of system faults for a modem and/or an associated telephone line which are coupled together through a modular plug on the modem and a modular jack on the telephone line, constructed according to the teachings of the present invention comprises a housing, a first multi-contact modular jack mounted on said housing and adapted to receive said modular jack mounted on said housing and adapted to receive said modular plug on said modular jack mounted on said housing, a set of conductors connecting the contacts on said second multi-contact modular jack with the contacts on said first multi-contact modular jack a test pin connected to each conductor and projecting outward there from, and a connector cable having a first multi-contact modular plug on one end adapted to be plugged into said second multi-contact modular plug on the other end adapted to be plugged into said modular jack on said telephone line, whereby said device may be coupled in series between said modem and said telephone line and tests conducted through said test pins.

The foregoing and other objects and advantages will appear from the description to follow. In the description, reference is made to the accompanying drawing which forms a part thereof, and in which is shown by way of illustration, a specific embodiment for practicing the invention. This embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTIN OF THE DRAWINGS

In the drawings wherein like reference numerals represent like parts:

FIG. 1 is a perspective view, partly broken away, of an embodiment of a device constructed according to the teachings of the present invention;

FIG. 2 is a schematic electrical circuit diagram of the box shown in FIG. 2;

FIG. 3 is an enlarged section view taken along lines 3—3 in FIG. 1;

FIG. 4 is an enlarged section view taken along lines 4—4 in FIG. 1; and

FIG. 5 is an enlarged section view taken along lines 5—5 in FIG. 1.

DETAILED DESCRIPTION OF A PREFERRED EMBODIMENT

The present invention is directed to a device for use in testing a modem and/or an associated telephone line which are coupled together by modular type connectors.

For illustrative purposes, the invention will hereinafter be described specifically for use with a modem having a male type modular connector and a telephone line having a female type modular connector.

Referring now to the drawings, there is illustrated an embodiment of a test device constructed according to the teachings of the present invention and identified generally by reference numeral 11.

Test device 11 includes a generally rectangular box or housing 13 having a hingedly mounted cover plate 15. A clip 17 is integrally formed on the front of cover plate 15 for engaging a slot 19 formed on the front wall 21 of box 13 to maintain cover plate 15 shut when the device is not in use. A printed circuit board panel 23 is mounted by any suitable means (not shown) inside box 13 a suitable distance down from the top. A first eight-contact modular jack 25 adapted to receive either a four-contact, six-contact or eight-contact modular plug attached to a modem (not shown) is mounted in an opening formed at one end 27 of box 13 and secured in place thereof by any suitable means (not shown). A second eight-contact modular jack 29 is mounted in an opening formed at the other end 31 of box 13 and secured in place thereof by any suitable means (not shown). Jack 25 is electrically connected to jack 29 by a printed circuit 33 which is formed on the underside of panel 23.

As can be seen in FIG. 2, jack 25 includes eight contacts numbered 25-1 through 25-8 and jack 29 includes eight contacts numbered 29-1 through 29-8. Each contact on jack 25 is connected to a corresponding contact on jack 29 by a separate conductor element, the conductor elements being numbered 35-1 through 35-8. Thus, contact 25-1 on jack 25 is connected through conductor element 35-1 to contact 29-1 on jack 29 and so forth. A separate test pin is connected to each conductor element, the test pins being numbered 37-1 through 37-8, respectively. As can be seen in FIG. 1, the test pins project upward from the top side of panel 15 and are suitably spaced from one another so that they can be individually contacted by a test probe or a clip. Panel 15 also includes a legend on its top surface identifying the various pins 37-1 through 37-8.

Test device 11 further includes a set of three connector cables 39, 41 and 43. Connector cable 39 is used for connecting jack 29 on box 13 to an eight-contact modular jack on a telephone line, connector cable 41 is used for connecting jack 29 on box 13 to a six-contact modular jack on a telephone line and connector cable 43 is used for connecting jack 29 on box 13 to a four-contact modular jack on a telephone line.

Connector cable 39 is made up of eight wires numbered 45-1 through 45-8. Cable 39 terminates at one end in a first eight-contact modular plug 47, the contacts being numbered 47-1 through 47-8 and terminates at the other end in a second eight-contact modular plug 49, the contacts being numbered 49-1 through 49-8.

Connector cable 41 is a six wire cable having an eight contact modular plug 51 at one end, the contacts being numbered 51-1 through 51-8 and a six wire modular plug 53 at the other end, the contacts being numbered 53-1 through 53-6 with the six wires connecting contact elements 53-1 through 53-6 in plug 53, with contact elements 51-2 through 51-7 in plug 51. Connector cable 43 is a four wire cable having an eight contact modular plug 55 at one end, the contacts being numbered 55-1 through 55-8 and a four contact modular plug 57 at the other end, the contacts being numbered 57-1 through 57-4, with the four wires connecting contacts 57-1 through 57-4 on plug 57 to contacts 55-3 through 55-6 respectively on plug 55.

In using test device 11, the plug attached to the modem is inserted into jack 25. One of the cables is then used to connect jack 29 to the jack connected to the telephone line. If the jack on the telephone line is an eight-contact jack, then cable 39 is used. If the jack on the telephone line is a six-contact jack, then cable 41 is used with plug 51 being inserted into jack 29 and plug 53 being inserted into the telephone line jack. If the jack on the telephone line is a four-contact jack, then cable 43 is used with plug 55 being inserted into jack 29 and plug 55 being inserted into the telephone line jack.

Once connected, the various lines may be tested by contacting one or more test pins 37 with test probes or clips attached to test equipment, the particular tests to be performed and the particular type of test equipment (i.e. a voltmeter, etc.) not being a part of this invention.

Alternatively, plug 51 may be a six-contact rather than an eight-contact modular plug and plug 55 may be a four-contact rather than an eight-contact modular plug. In each case, such a plug will mate with or can be made to mate with the eight-contact modular jack 29.

As can be appreciated, connector 29 could be a plug rather than a jack in which case connectors 47, 51 and 55 would be jacks rather than plugs. Also, connectors 29, 47, 51 and 55 need not even be modular. Also, connector 25 could be a plug rather than a jack if the connector attached to the modem is a jack rather than a plug. Similarily, plugs 49-1, 53-1 and 57-1 could be jacks rather than plugs if the connector on the telephone line is a plug rather than a jack.

As can also be appreciated, any one of the cables 39, 41 and 43 could be hardwired to the set of contact elements 35 rather than coupled together by a pair of mating connectors if a device connectable to only one type of jack on the telephone line is desired.

As is evident, the device enables quick and efficient testing of a modem and/or an associated telephone line which are connected by modular connectors using test equipment having standard sized test probes and/or alligator clips while the modem is electrically connected to the telephone line and without having to either disconnect any connector from its wires or strip off the insulation surrounding any of the wires so that the wires are exposed.

Dimensions of box 13 may be as follows:
Length—4 inches
Width—2½ inches
Height—2¼ inches
Distance of panel 23 from top—1 inch Test pins 37 may have a length of 5/16 of an inch and may be spaced apart ⅜ of an inch from one another.

When not being used, cables 39, 41 and 43 may be stored in box 13 in the space above panel 13.

Modular jacks 25 and 29 may each be a Darlabs Inc. of Harvard, Mass. eight-contact jack part number 143,227.

Modular plugs 47, 49 and 51 and 55 may each be a Darlabs, Inc. of Harvard, Mass. eight-contact plug part number 176,123.

Modular plug 53 may be a Darlabs Inc. of Harvard, Mass. six-contact plug part number 176,116 and modular plug 57 may be a Darlabs Inc. of Harvard, Mass. four-contact plug part number 176,120.

The embodiment of the present invention is intended to merely exemplary and those skilled in the art shall be able to make numerous variations and modifications to it without departing from the spirit of the present invention. All such variations and modifications are intended to be within the scope of the present invention as defined in the appended claims.

What is claimed is:

1. A device for use in testing the wiring integrity and/or determining the location of system faults for a modem and/or an associated telephone line which are coupled together through a modular plug on the modem and a modular jack on the telephone line, the device comprising:

a. a housing,
b. a first multi-contact modular jack mounted on said housing and adapted to receive said modular plug on said modem,
c. a second multi-contact modular jack mounted on said housing,
d. a set of conductors connecting the contacts on said second multi-contact modular jack with the contacts on said first multi-contact modular jack,
e. a test pin connected to each conductor and projecting outward therefrom, and
f. a connector cable having a first multi-contact modular plug on one end adapted to be plugged into said second multi-contact modular jack and a second multi-contact modular plug on the other end adapted to be plugged into said modular jack on said telephone line,
g. whereby, said device may be coupled in series between said modem and said telephone line and tests conducted through said test pins.

2. The device of claim 1 and wherein said first multi-contact modular jack contains eight contact elements, said second multi-contact modular jack contains eight contact elements and said set of conductors comprise eight conductors, each conductor connecting one contact element in said first multi-contact modular jack with a corresponding contact element in said second multi-contact modular jack.

3. The device of claim 2 and wherein said first multi-contact modular plug contains eight contacts elements and said second multi-contact modular plug contains eight contact elements.

4. The device of claim 2 and wherein said first multi-contact modular plug contains eight contact elements and said second multi-contact modular plug contains six contact elements.

5. The device of claim 2 and wherein said first multi-contact modular plug contains eight contact elements and said second multi-contact modular plug contains four contact elements.

6. The device of claim 1 and wherein said casing comprises a box-like housing having a hingedly mounted lid.

7. A device for use in testing the wiring integrity and/or determining the location of system faults for a modem and/or an associated telephone line which are coupled together through a modular plug on the modem and a modular jack on the telephone line, the device comprising:
a. a housing,
b. a first multi-contact modular jack mounted on said housing and adapted to receive said modular plug on said modem,
c. a second multi-contact modular jack mounted on said housing,
d. a set of conductors connecting the contacts on said second multi-contact modular jack with the contacts on said first multi-contact modular jack,
e. a test pin connected to each conductor and projecting outward therefrom, and
f. a set of three connector cables, the first connector cable having a first multi-contact modular plug on one end adapted to be plugged into said second multi-contact modular jack and an eight contact modular jack on the other end adapted to be plugged into an eight contact modular jack on the telephone line, the second connector cable having a first multi-contact modular jack on one end adapted to be plugged into said second multi-contact modular jack and a six-contact modular jack on the other end adapted to be plugged into a six contact modular jack on the telephone line and the third connector cable having a first multi-contact modular jack at one end adapted to be plugged into said second multi-contact modular jack and a four contact modular plug on the other end adapted to be plugged into a four contact modular jack on the telephone line.

8. A device for use in testing the wiring integrity and/or determining the location of system faults for a modem and/or an associated telephone line which are coupled together through a modular connector on the modem and a modular connector on the telephone line comprising:
a. a first multi-contact modular connector adapted to mate with said modular connector on said modem,
b. a conductor connected to each contact element on said first multi-contact modular connector,
c. a test pin connected to each conductor element, and
d. connecting means connected to each conductor and adapted to mate with said modular connector on said telephone line for connecting said device in series between said modem and said telephone line,
e. whereby, testing may be performed through said test pins.

9. The device of claim 8 and wherein said connecting means includes a connecting cable having a modular connector at one end adapted to mate with said modular connector on said telephone line.

* * * * *